US007961134B2

(12) United States Patent
Ranney et al.

(10) Patent No.: US 7,961,134 B2
(45) Date of Patent: Jun. 14, 2011

(54) METRIC AND SELF-CALIBRATION FOR AN AUTOMATIC, SURVEILLANCE-BASED CHANGE DETECTION SYSTEM OPERATING ON NOISY IMAGERY

(75) Inventors: Kenneth I. Ranney, Rockville, MD (US); Jeffrey Sichina, Ocean View, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 95 days.

(21) Appl. No.: 12/563,571

(22) Filed: Sep. 21, 2009

(65) Prior Publication Data

US 2010/0238298 A1    Sep. 23, 2010

Related U.S. Application Data (60) Provisional application No. 61/161,188, filed on Mar. 18, 2009.

(51) Int. Cl.
G01S 13/90      (2006.01)
G01S 7/40       (2006.01)
H04N 17/00      (2006.01)
G06K 9/68       (2006.01)

(52) U.S. Cl. .................. 342/25 R; 342/174; 342/25 A; 342/25 F; 342/52; 348/188; 382/218; 382/294

(58) Field of Classification Search .................. 342/174, 342/25 R, 25 A–25 F, 52, 55, 90–93, 159–162, 342/179, 195, 197; 348/188; 382/218, 294; 356/521, 484, 450
See application file for complete search history.

(56) References Cited

U.S. PATENT DOCUMENTS

| 6,360,027 | B1 | 3/2002 | Hossack et al. | |
|---|---|---|---|---|
| 6,993,182 | B2 | 1/2006 | Yang et al. | |
| 7,405,834 | B1 * | 7/2008 | Marron et al. | 356/521 |
| 7,421,149 | B2 | 9/2008 | Haynes et al. | |
| 7,551,119 | B1 * | 6/2009 | Doerry | 342/25 R |
| 7,796,829 | B2 * | 9/2010 | Nguyen et al. | 382/260 |
| 2005/0036658 | A1 | 2/2005 | Gibbins et al. | |
| 2007/0030998 | A1 | 2/2007 | O'Hara et al. | |
| 2008/0219573 | A1 | 9/2008 | Lu | |
| 2010/0109938 | A1 * | 5/2010 | Oswald et al. | 342/90 |

(Continued)

OTHER PUBLICATIONS

Yuan Lihai; Ge Jialong; Jiang Kai; Wang Yang; , "Research on efficient calibration techniques for airborne SAR systems," Synthetic Aperture Radar, 2009. APSAR 2009. 2nd Asian-Pacific Conference on , vol., no., pp. 266-269, Oct. 26-30, 2009.*

(Continued)

*Primary Examiner* — John B Sotomayor
(74) *Attorney, Agent, or Firm* — Christos S. Kyriakou (57) ABSTRACT

Self-calibrating an automatic, surveillance-based change detection system operating on noisy imagery comprises detecting a first image co-registered with a second image, wherein the first image and the second image each comprise pixels of a noisy image of a scene; detecting the second image co-registered with the first image, wherein co-registration of the first image with the second image comprises pixels from different images corresponding to a same location within the scene; producing a calibration factor based on the co-registered images; producing a modified ratio of pixel values corresponding to the first image and the second image from the same location within the scene; and comparing the modified ratio to a pre-determined threshold ratio value.

20 Claims, 8 Drawing Sheets

U.S. PATENT DOCUMENTS

| | | | |
|---|---|---|---|
| 2010/0141508 A1* | 6/2010 | Nguyen et al. | 342/25 F |
| 2010/0172567 A1* | 7/2010 | Prokoski | 382/132 |
| 2010/0191541 A1* | 7/2010 | Prokoski | 705/2 |
| 2010/0238298 A1* | 9/2010 | Ranney et al. | 348/188 |
| 2011/0012778 A1* | 1/2011 | Nguyen et al. | 342/25 A |

OTHER PUBLICATIONS

Horstmann, J.; Lehner, S.; , "A new method for radiometric calibration of spaceborne SAR and its global monitoring," Geoscience and Remote Sensing Symposium, 2002. IGARSS '02. 2002 IEEE International , vol. 1, no., pp. 620-622 vol. 1, 2002.*

Lauknes, I.; Johnsen, H.; Guneriussen, T.; , "Geometric and radiometric calibration of synthetic aperture radar images acquired in alpine regions-spaceborne and airborne," Geoscience and Remote Sensing Symposium Proceedings, 1998. IGARSS '98. 1998 IEEE International , vol. 2, no., pp. 1134-1136 vol. 2, Jul. 6-10, 1998.*

Richard J. Radke, et al. "Image Change Detection Algorithms: A Systematic Survey," IEEE Transactions on Image Processing, vol. 14, 2005, pp. 294-307 (Apr. 19, 2004).

E. Rignot and J. van Zyl, "Change Detection Techniques for ERS-1 SAR Data," IEEE Transactions on Geoscience and Remote Sensing, vol. 31, No. 4, 1993, pp. 896-906.

Rignot et al. "A Bayes Classifier . . . " Proceedings of IEEE International Conference on Acoustics Speech and Signal Processing, vol. 3, 1992, pp. 25-28.

Ranney et al. "A Modified Difference . . . " IEEE Transactions on Aerospace and Electronic Systems, vol. 44, No. 1, 2008, pp. 57-76.

L. Novak, "Change detection for multi-polarization, multi-pass SAR," Proceedings of SPIE, vol. 5808, 2005, pp. 234-246.

* cited by examiner

METRIC AND SELF-CALIBRATION FOR AN AUTOMATIC, SURVEILLANCE-BASED CHANGE DETECTION SYSTEM OPERATING ON NOISY IMAGERY

CROSS REFERENCE TO RELATED APPLICATIONS

This patent application claims the benefit of U.S. Provisional Patent application No. 61/161,188 filed Mar. 18, 2009. U.S. Provisional Patent application No. 61/161,188 is hereby incorporated herein by reference in its entirety.

GOVERNMENT INTEREST

The invention described herein may be manufactured, used, and licensed by or for the United States Government.

BACKGROUND

1. Technical Field

The embodiments herein generally relate to computerized image systems and, more particularly, to detection systems for comparing changes in imagery.

2. Description of the Related Art

The highly variable nature of radar measurements has plagued automatic target detection algorithm developers for decades. In particular, the variability introduced (in certain circumstances) by system noise and synthetic aperture processing compound the problem for small targets. While a change detection mode of operation may allow the detector to combat these effects, the false alarm rate can still remain unacceptably high. This is even true when the highly popular ratio-based tests are applied to synthetic aperture radar (SAR) systems.

One method of addressing this problem is to exploit spatial or temporal averaging to reduce the variance of the underlying random phenomena. If only a single pass, or look, is available for this purpose, then multiple looks for averaging must be synthesized, either through spatial averaging or subaperture processing. This implies that the resulting multi-look averaged SAR image will likely have lower resolution than the non-averaged one. Such a trade-off, however, is often reasonable, especially if the targets of intent comprise several image pixels. Even with spatial or temporal averaging, however, the false alarm rate often remains too high.

One can also address the false alarm problem by setting various thresholds to eliminate (in some way) clearly unsuitable samples from consideration. These thresholds can be incorporated either as floors for the denominator and numerator values used to form the ratio, or as "gatekeepers" for considering pixel locations as possible change locations. If a pixel location fails to pass the "gatekeeper", it is eliminated from consideration. Unfortunately, such an algorithmic modification adds complexity, and while it should effectively eliminate certain false alarms, it also creates new parameters—the threshold—that must be determined. For a radar system operating at an extremely low grazing angle, however, the benefits of false alarm reduction may well outweigh any drawbacks due to increased algorithmic complexity. Under these operating conditions, the SAR images produced by the system would most likely contain long shadows and other regions of low intensity due to heavy forward scattering. Hence, the denominator of the ratio test would often contain small values, and the resulting ratio would be artificially large.

A change detection system compares imagery (i.e. a two-dimensional representation of a scene) collected at different times to determine if any changes have occurred. Typically, the image pixels indicate the amount of energy reflected or emitted from a particular location (e.g. a photograph or a synthetic aperture radar image). One commonly implemented change detection system utilizes a ratio test, calculating the ratio of pixel values from the same location and comparing this ratio to a pre-determined threshold. In fact, ratio-based change detection has been shown to be optimal under certain operating conditions. The system designates locations with pixel ratios exceeding the threshold as being change locations. Unfortunately, such a system is unable to operate effectively in the presence of noisy, imperfect image data. Some attempts to modify the system have been made, but these approaches generally are ad hoc and fail to provide a systematic approach to the problem.

SUMMARY

In view of the foregoing, the embodiments herein provide a system and method for self-calibrating an automatic, surveillance-based change detection system operating on noisy imagery comprising a first sensor that detects a first image co-registered with a second image, wherein the first image and the second image each comprise pixels of a noisy image of a scene; a second sensor that detects the second image co-registered with the first image, wherein co-registration of the first image with the second image comprises pixels from different images corresponding to a same location within the scene; a calibration factor module that receives co-registered imagery data of the first image and the second image and produces a calibration factor based on the co-registered images; a metric calculator that directly or indirectly receives the co-registered imagery data and directly or indirectly receives the calibration factor and produces a modified ratio of pixel values corresponding to the first image and the second image from the same location within the scene; and a modified ratio test module that compares the modified ratio to a pre-determined threshold ratio value.

The noisy image comprises synthetic aperture radar imagery, grainy photography, and low signal-to-noise ratio video frames. The metric calculator sorts pixel values in the first image. The metric calculator groups the sorted pixels according to value such that all pixels within an interval of a particular length are combined to form at least one pixel set, makes a list of pixel locations within each of the at least one pixel set, and calculates a mean pixel value for each of the at least one pixel set. The metric calculator selects a set of pixel locations from one of the at least one pixel set, extracts spatially corresponding pixel values from the second image, and calculates a mean value of the pixel values from the second image. The metric calculator plots the calculated mean values for the at least one pixel set from the first image, and plots the calculated mean values for pixel sets from the second image, wherein the plot corresponding to the second image is plotted over the plot corresponding to the first image.

The metric calculator records a corresponding value where a slope of the plots corresponding to the first image and the second image begin to correspond with one another. The metric calculator adjusts the plot corresponding to the second image so that the plot corresponding to the second image overlays the plot corresponding to the first image when the interval of the particular length is greater than the corresponding value, and wherein the amount of vertical offset between the plots comprises the calibration factor. The metric calculator applies the calibration factor to the second image.

Figure 3:
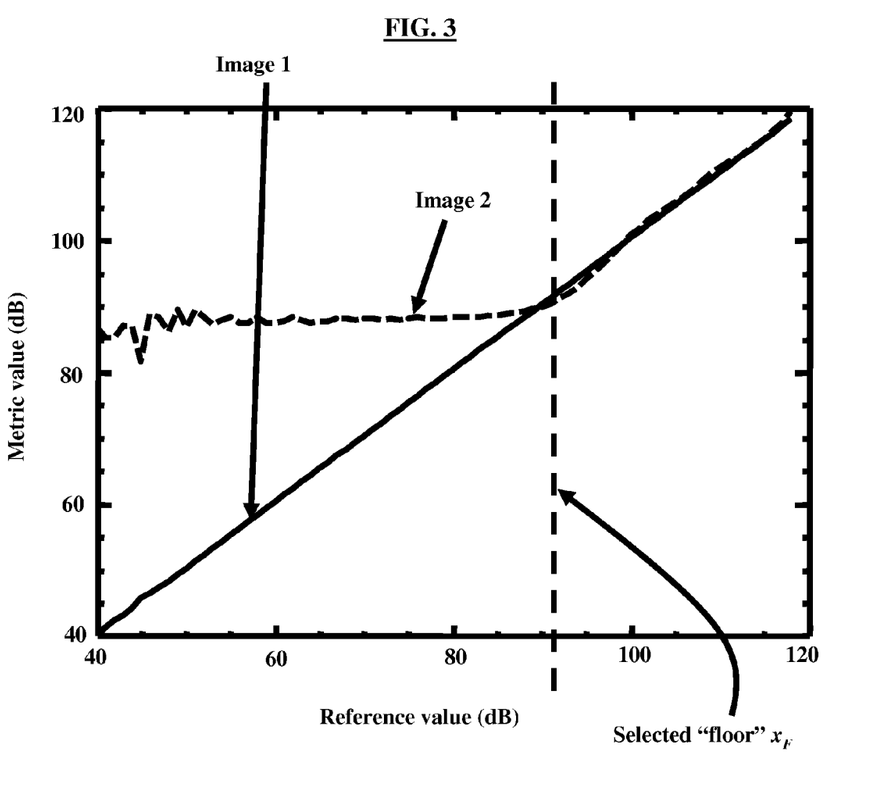
FIG. 3 illustrates a graphical representation comparing metric values of two co-registered images according to an embodiment herein.

Another embodiment provides a method for self-calibrating an automatic, surveillance-based change detection system operating on noisy imagery, wherein the method comprises receiving a first image that has been co-registered with a second image, wherein the first image and the second image each comprise pixels of a noisy image of a scene; receiving the second image that has been co-registered with the first image, wherein co-registration of the first image with the second image comprises pixels from different images corresponding to a same location within the scene; producing a calibration factor based on the co-registered images; and producing a modified ratio of pixel values corresponding to the first image and the second image from the same location within the scene, wherein the modified ratio equals pixel values corresponding to the first image divided by the maximum of (1) the pixel values corresponding to the second image and (2) the value where the slope of graphical plots corresponding to the first image and the second image begin to correspond with one another, for example the selected "floor" $x_F$ where the first image line and second image line intersect and begin to correspond to one another as illustrated in FIG. 3.

The method further comprises sorting pixel values in the first image; grouping the sorted pixels according to value such that all pixels within an interval of a particular length are combined to form at least one pixel set, making a list of pixel locations within each of the at least one pixel set, and calculating a mean pixel value for each of the at least one pixel set; selecting a set of pixel locations from one of the at least one pixel set, extracting spatially corresponding pixel values from the second image, and calculating a mean value of the pixel values from the second image; plotting the calculated mean values for the at least one pixel set from the first image, and plotting the calculated mean values for pixel sets from the second image, wherein the plot corresponding to the second image is plotted over the plot corresponding to the first image; recording the value where the slope of the plots corresponding to the first image and the second image begin to correspond with one another; adjusting the plot corresponding to the second image so that the plot corresponding to the second image overlays the plot corresponding to the first image when the interval of the particular length is greater than the corresponding value, and wherein the amount of vertical offset between the plots comprises the calibration factor; and applying the calibration factor to the second image.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a system and method for enhancing a ratio-based change in detection methodologies based on a SAR system's current noise and clutter background characteristics. The embodiments herein enhance the performance of the resulting, modified ratio-based change detection system. Referring now to the drawings, and more particularly to FIGS. 1 through 8, where similar reference characters denote corresponding features consistently throughout the figures, there are shown preferred embodiments.

Generally, the embodiments herein enhance a ratio-based change detection system 100 based on a SAR system's current noise and clutter background characteristics. The approach hinges on the assumption that SAR magnitude images of the same terrain should remain essentially the same for two runs that are collected only minutes apart using the same platform trajectory. This initial "no-change" comparison acts as an additional "calibration" step indicating reasonable choices for certain algorithm parameter values needed for the enhanced change detector. The embodiments herein provide modifications to the ratio test implemented to reduce the false alarm rate. In particular, the embodiments provide a similarity metric that quantifies both spatial and magnitude image correlation.

Figure 1:
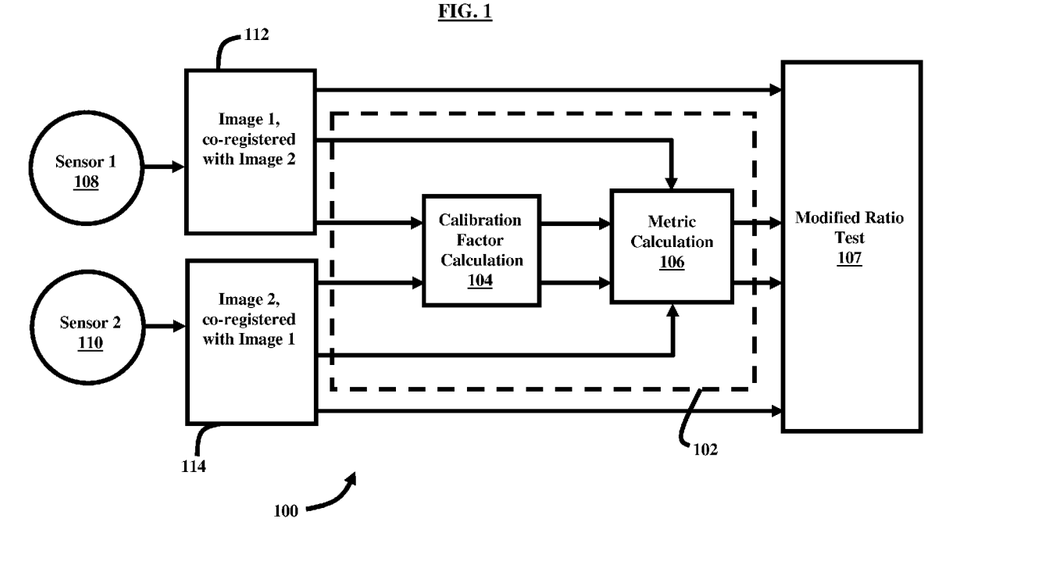
FIG. 1 illustrates a block diagram of a change detection system according to an embodiment herein.

FIG. 1 illustrates a block diagram of a change detection system 100 according to an embodiment herein, wherein the dashed box 102 indicates the elements of a (self) calibration factor calculation component 104 and a metric calculation component 106. The self-calibration and metric blocks 104, 106 constitute components of the system 100 such that the information discovered using the metric 106 directly impacts the ratio-based change detection statistical calculations 107.

The embodiments herein may be configured for use on a surveillance-based change detection system that re-visits an area under surveillance within several hours or days (as opposed to months). The imaging sensors 108, 110 are assumed to produce noisy imagery; and examples of such data include synthetic aperture radar imagery, grainy photography, or frames from low-SNR (signal-to-noise ratio) video. The inputted images 112, 114 are co-registered so that the same pixels from different images correspond to the same location within a scene. A block diagram outlining the metric block 106 is illustrated in greater detail in FIG. 2, which further illustrates how the method provided by the embodiments herein could be implemented into an existing legacy system. The various blocks in FIG. 2 not surrounded by dashed lines correspond to the metric block 106 of FIG. 1.

Figure 2:
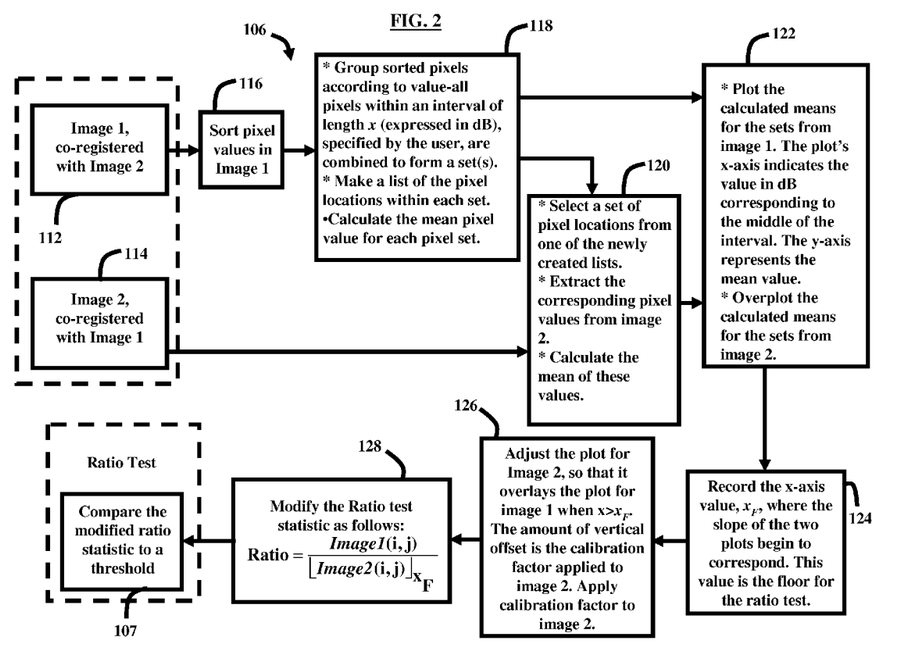
FIG. 2 illustrates a block diagram of a process flow according to an embodiment herein.

As depicted in FIG. 2, image 1 is co-registered with image 2 as provided in block 112; and image 2 is co-registered with image 1 as indicated in block 114. Then, the pixel values in image 1 are sorted as shown in block 116. Then, as indicated in block 118, the sorted pixels are first grouped according to value, whereby all pixels within an interval of length x (expressed in dB), which are specified by the user, are combined to form a set (and typically a plurality of sets). Second, a list of the pixel locations with each set is made, and third, the mean pixel value for each pixel set is calculated.

At this point the process branches to block 120 and block 122. In block 120, a set of pixel locations is selected from one of the newly created lists from block 118. The spatially corresponding pixel values from image 2 are extracted, and the mean of these values is calculated. In block 122, the calculated means for the sets from image 1 are plotted. The x-axis of the plot indicates the value in dB corresponding to the middle of the interval, and the y-axis represents the mean value. Thereafter, the calculated means for the sets from image 2 are "overplotted".

In the next block 124, the x-axis value $x_F$ is recorded where the slope of the two plots begin to correspond with one another. This value is the floor for the ratio test. In block 126, the plot for image 2 is adjusted so that it overlays the plot for image 1 when $x > x_F$. The amount of vertical offset is the calibration factor applied to image 2, and a calibration factor (component 104 in FIG. 1) is applied to image 2. Next, the ratio test statistic is modified as provided in block 128 as follows:

$$\text{Ratio} = \frac{X_1}{\lfloor X_2 \rfloor_{x_T}}$$

(see also formula (3) on page 13 and the accompanying description). Thereafter, in block 107, the modified ratio statistic is compared to a predetermined threshold. The modified ratio equals pixel values corresponding to the first image divided by the maximum of (1) the pixel values corresponding to the second image and (2) the value where the slope of graphical plots corresponding to the first image and the second image begin to correspond with one another, e.g. the selected "floor" $x_F$ where the first image line and second image line intersect and begin to correspond to one another as illustrated in FIG. 3.

FIG. 3 illustrates the graphical plots of the reference value (in dB) vs. the metric value (in dB) (of FIG. 2), and illustrates how the value $x_F$ is determined. In FIG. 2, the calibration factor is unity, so no additional calibration of image 2 is necessary. If this had not been the case, then the plot in image 2 would have been offset from that for image 1 for x>95 dB.

Again, the operational mode of the method herein includes frequent observation of a particular area of interest. It is this relatively short time between looks at the scene that enables the embodiments herein to work successfully.

The metric and calibration procedure provided by the embodiments herein and described in FIG. 1 provides a systematic determination of parameters needed by a modified ratio-based change detection system 100 (of FIG. 1). When included as a subsystem in an existing ratio-based change detection system, the subsystem 100 reduces false alarms for a given probability of detection.

The embodiments herein provide a technique to determine realistic threshold values for incorporation into a modified ratio test 107; e.g., excluding small values from the denominator of the ratio. The technique is based on a preliminary pair of "no change" or "calibration" runs together with the assumption that SAR data from the same terrain (i.e., image) collected minutes or possibly even hours or days apart will produce similar SAR images. After a small amount of post-processing the major differences between the images should be due to system noise and subtle image misalignment.

Heuristically stated, a metric, as used in accordance with the embodiments herein, is defined as part of the algorithm modifications that should indicate which pixel locations within a scene correspond to actual physical "reflectors". That is, one should be able to use the metric to distinguish pixels within a shadowed, noise-like region from those due to a reasonably-sized target or clutter discretes. The resulting definition involves the correlation between two images in both spatial location and a pixel magnitude. If the images are spatially co-registered, one would expect to see pixel values from a geographical region in one image similar to those from the corresponding geographical region in the second image. Similarly, if the values are not similar (as determined by the metric), then either a change has occurred from one data collection to the next or the region under consideration is noise-like. In fact, if the reference pixels from one of the images were all extremely close to some low value, then one might expect the average from the spatially corresponding pixels in the second image to approach the average calculated for noise alone. This would especially be true even if the reference "noise" pixels—all independent, identically distributed random samples—were all selected to be very much below the noise average.

This observation suggests an approach for defining a useful metric as follows: one image is selected as a reference image and all of the image pixels are sorted according to magnitude. Then, a bin size (in a log-scale) is selected, and a specified interval (also a log scale, between a specified minimum value and a specified maximum value) is divided into a collection of contiguous bins. Next, each of the reference pixels are placed into the bin that includes its log scale magnitude. Thereafter, one of the bins is selected, and all of the coordinates for pixels within that bin are tabulated. Then, the spatially corresponding pixels are located in the second image, and the root mean square (RMS) average for all of the pixel values from each of the images are separately calculated. As noted above, if the samples were from a "noise" region, one would expect the average from the second image to approach the average value of noise. If the samples were due to target or clutter, however, one would expect them to be correlated and their averages to be close to one another.

Let $\theta = \{I_{ref}(x)\}$ represent the set of indices in the reference image corresponding to pixel intensity, x. That is, $\{I_{ref}(x)\}$ includes the indices of all reference image pixels with intensities falling within the same bin as x. Let $F_{ref}(n)$ and $F_{test}(n)$ represent M×N images indexed by the unique integer n corresponding to the two-dimensional pixel coordinate (x,y). This value of n is calculated according to the formula:

$$n = My + x \quad (1)$$

Hence, one can define the value of the metric at pixel intensity x as follows:

$$m = \frac{\sqrt{\sum_{i \in I_{ref}(z)} F_{test}(i)^2}}{\sqrt{\sum_{i \in I_{ref}(z)} F_{ref}(i)^2}} = \frac{\alpha}{\beta}, z \in [z_{min}, z_{max}], \quad (2)$$

where $z_{min}$ and $z_{max}$ represent the specified minimum and maximum sample values mentioned above.

From equation (2) one can immediately identify an intuitive, graphical method of evaluating the metric. The values of α and β are plotted in a log-scale as a function of x, and the value of x at which the two curves begin to overlap is the value at which the noise level has been adequately exceeded. It is pixel values above this level that are of interest here. This value of x is denoted as $x_\tau$ and it is incorporated into the modified ratio test 107 as further described below.

With respect to ratio test modifications, the threshold, $x_\tau$ is intended to discriminate pixels that exceed a noise floor from those that do not; so, values in the denominator that are less than the threshold are set equal to the threshold. As a result, the modification ratio test becomes:

$$R = \frac{X_1}{\lfloor X_2 \rfloor_{x_\tau}} \quad (3)$$

where $X_1$ and $X_2$ are the images under examination, one of which may or may not be the same as $F_{ref}$ or $F_{test}$ and $\lfloor . \rfloor_{x_\tau}$ denotes a "flooring" operation, whereby all values less than $x_\tau$ are set equal to $x_\tau$. As seen from equation (3), the inclusion of a threshold will eliminate the small denominator values that could cause a significant increase in the number of false alarms.

With respect to the analysis of the metric using simulated data, as an initial step, data is simulated to evaluate the metric's behavior under anticipated operating conditions. Since the data are to represent samples from a coherent SAR system, one may create both real and imaginary samples. The real and imaginary noise samples are assumed to be white and follow a Gaussian distribution with means, μ=0 and variance $\sigma^2 = \frac{1}{2}$. That is, they are $N(0, \frac{1}{2})$ random variables (RVs). The "signal+noise" samples are also complex and comprise a constant magnitude signal with a random phase plus Gaussian, $N(0, \frac{1}{2})$ noise. This formulation allows one to systematically vary the SNR across a wide range of values. A particular pixel value may be expressed mathematically using the expression:

$$D = s_i(n, \Phi) + \text{Noise}(n), \quad (4)$$

where $s_i$ represents the signal magnitude from region i (zero in the case of noise alone), Φ represents the random phase (i.e. arctan (imaginary $(s_i(n,\Phi))$/real $(s_i(n, \Phi))$), and n denotes the index corresponding to a particular image pixel.

Figure 4:
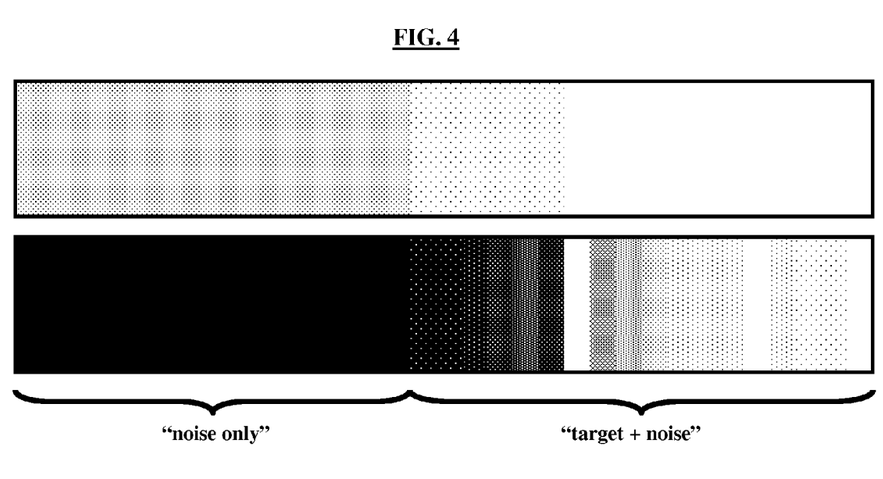
FIG. 4 illustrates a schematic diagram of a simulated data scene used to generate a metric according to an embodiment herein.

The simulated scene comprises a "noise-only" region and several "target plus noise" regions, as illustrated in the bottom image of FIG. 4. The relative shading indicates the dynamic range of the pixel intensities, where black dots in the top image of FIG. 4 indicate the location of low-intensity samples (between −60 dB and −15 dB relative to the average noise intensity (power)). The average noise power is scaled within the scene of unity, and also the signal (target) level is scaled in increments of 0.5 dB relative to this ambient noise level. This systematic increase in the target level begins at 1 dB; however, target levels of 0 dB, −3 dB and −6 dB are also included for purposes of comparison. While the phase of an underlying target data sample is random, its magnitude is fixed; this simplifies the process of re-scaling targets samples to different intensities. Also, two of these simulated scenes are created—one that serves as the reference image and another that serves as the test image. In addition, spatially averaged versions of the reference and test images are created to determine the effects of spatial average on the effectiveness of the metric.

Based on the bottom image of FIG. 4, it is expected that the smallest pixel values are spatially localized to either the "noise only" region or one of the lowest "target+noise" regions (e.g. target level of −6 dB, −3 dB, or 0 dB). This is exactly what is observed as depicted by the imagery in the top image of FIG. 4. Again, here, black dots indicate locations of samples that are between −60 dB and −15 dB relative to the average noise power. It is qualitatively clear from the imagery that the samples are indeed located within the regions that are predicted.

Figure 5:
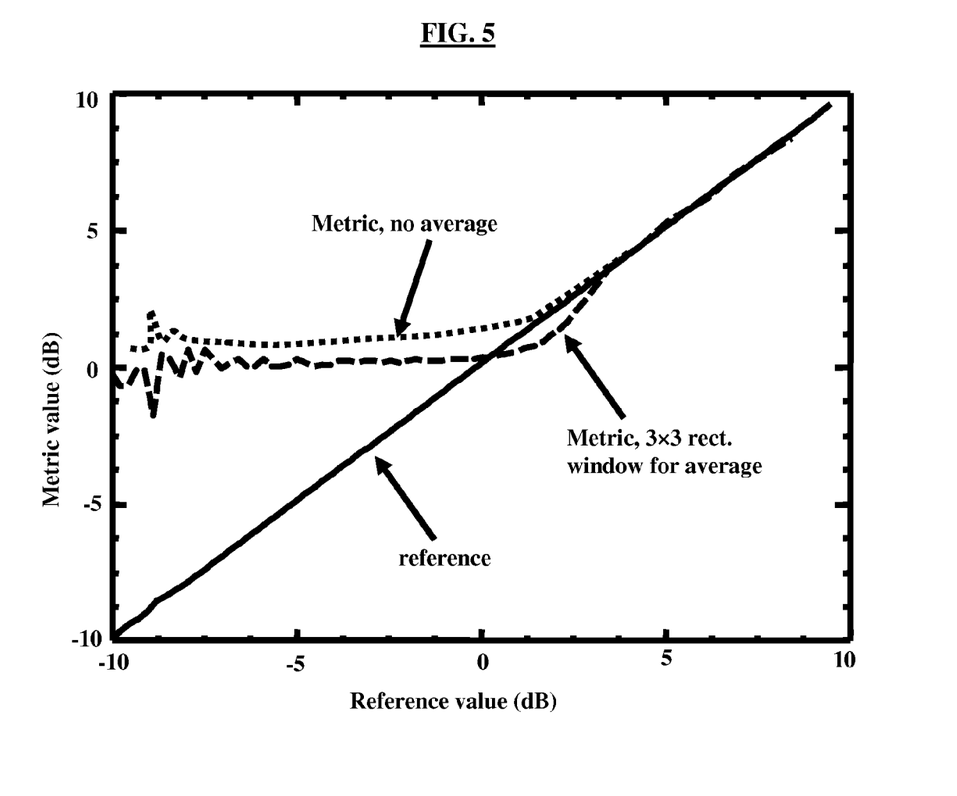
FIG. 5 illustrates a graphical representation comparing metric values calculated for original and spatially averaged versions of data according to an embodiment herein.

Because the corresponding test image samples are independent of those from the reference image, one might initially expect the average power of these test samples to approach the average power of noise without exception. A closer examination of the simulation hypotheses, however, indicates that this assumption is not valid when spatial averaging is absent (i.e., for non-average data). As illustrated in FIG. 5, one should actually expect the non-averaged "noise data" to be biased slightly high, due to the percentage of samples coming from higher-intensity "target+noise" regions. These samples approach a higher "target+noise" average instead of the "noise" average, resulting in the observed bias. Since spatial averaging reduces the variance of pixel values within a particular region, it ensures that a larger percentage of the lowest pixel values are located within the expected "noise only" spatial region. Hence, the incorporation of spatial averaging should drive the test curves closer to the underlying "noise only" value for extremely low reference values, as evident in the plots of FIG. 5, wherein metric values are shown as calculated for original and spatially averaged versions of the data. The bin size used is 0.125 dB. The bias has been eliminated even after averaging with a 3×3 spatial window. A detailed discussion of this phenomenon is included in the Appendix below.

With respect to an analysis of the metric provided by the embodiments herein using actual measured SAR data, we developed a synthetic impulse reconstruction (SIRE) radar system and employed it to collect data sets suitable for analysis for the proposed metric. Since the SIRE radar's implemented cross-range resolution is coarse by modern SAR standards, the approximation described above should be somewhat more accurate. In addition, of particular interest is the magnitude statistics for the same pixel in different images—not in the magnitude statistics of multiple pixels from a given region in the same image.

During testing, three runs are selected from the SIRE data set for use in determining the suitably of the metric for change detection (CD) algorithm enhancement. First, a ratio-based CD algorithm is applied to the original data to establish a qualitative baseline. Next, the metric is implemented and is used to determine parameters incorporated into the enchanced CD algorithm. Finally, the potential benefits realized through implementation of the enhanced change detector are analyzed. The metric evaluations utilize the graphical techniques illustrate in FIG. 5, while the CD algorithm evaluation utilizes direct comparisons of output statistics calculated for each pixel value within the imagery.

First, the implementation of an un-modified version of the ratio-based CD algorithm applied to the original (non-averaged) data occurs. The images used for this experiment have incorporated changes that are relatively small. For example, one of the "changes" comprises the insertion of a metal object into a box and another "change" includes the disturbance of tin cans inside a plastic bag. All of the images have a 40 dB dynamic range (i.e., 40 dB down from a common, artificially introduced peak value).

A change detection image is created for two different scenarios. The change detection image is formed by evaluating the ratio at each pixel location and assigning the result to that pixel location in a new image array. A nominal (extremely low) threshold is also included in order to slightly reduce the number of small denominator values encountered by the test. The first of the two scenarios operates in a true CD mode. The second scenario, however, operates in a pseudo-CD mode. The resulting imagery comprises one detection image for each scenario. Several target pixels are between approximately the 19 dB to 25 dB levels, indicating that they are only 10 to 15 dB above the prevalent false alarm levels, which are between approximately the 8 dB to 11 dB levels. The results of the experiment demonstrate that, under realistic operating conditions, enhancements to the ratio-based test are needed to reduce the number of potential false alarms.

Next, detection images are taken for an enhanced ratio test. There is an increase in the number of target pixel values falling between 15 and 25 dB (i.e., near the peak value). Additionally, there is an increase in the number of background pixel values equal to 0 dB. Finally, the process is repeated for spatially averaged data formed by convolving each run with a 15×15 rectangular window. The averaged data is then used to create detection imagery for the enhanced and un-enhanced versions of the CD test as described above. Thus, four additional images are created—two for the enhanced ratio test and two for the un-enhanced ratio test. These resulting images indicate that the enhanced version of the CD test removes a large number of potential false alarms through the incorporation of a suitably selected "floor".

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
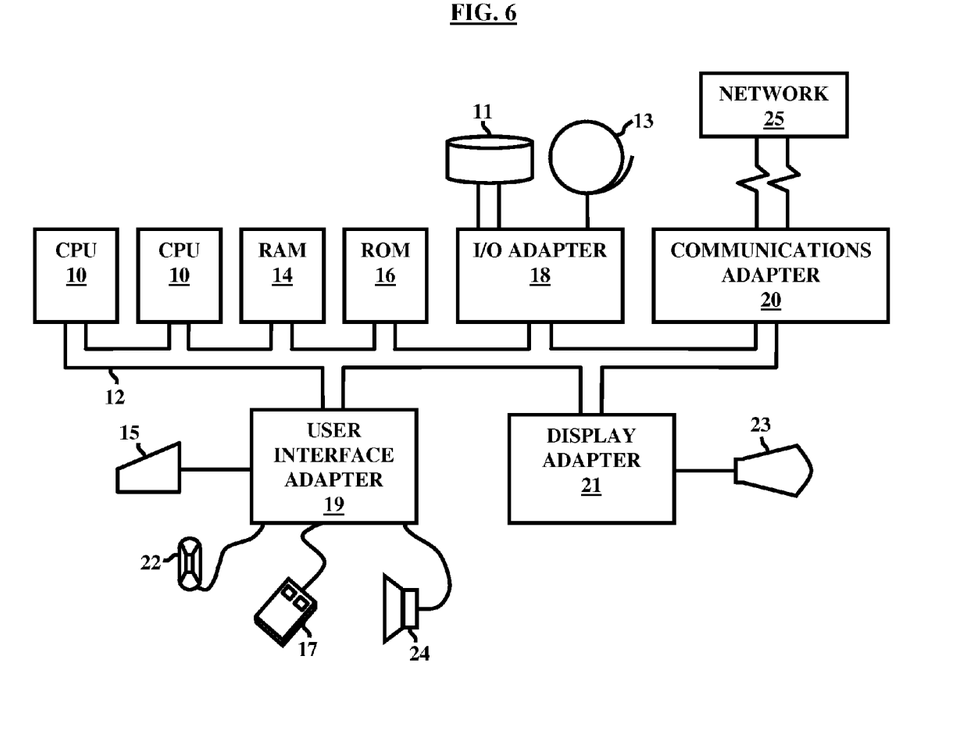
FIG. 6 illustrates a schematic diagram of a computer architecture used in accordance with embodiments herein.
Figure 7:
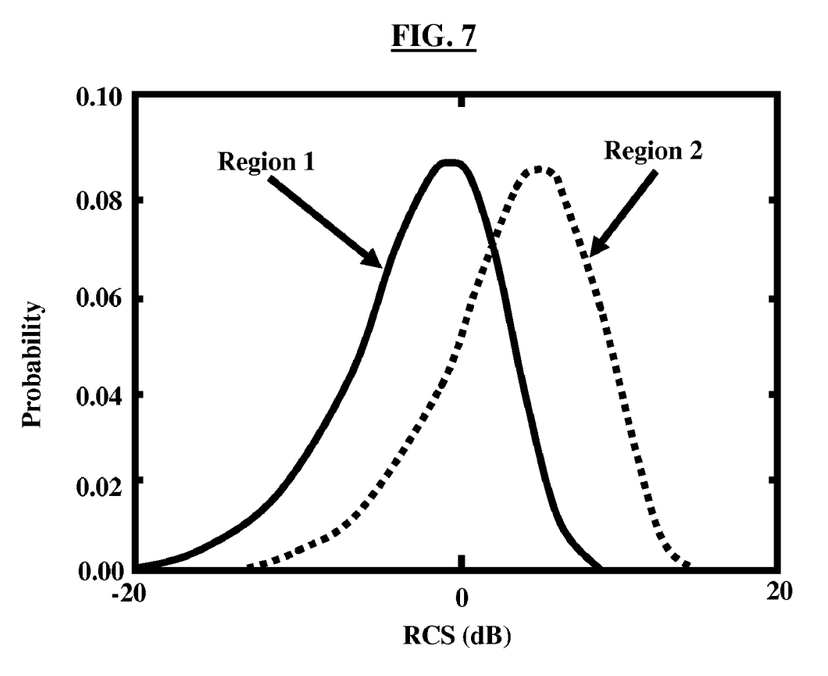
FIG. 7 illustrates a graphical representation comparing the probability that a pixel value will fall within a 1 dB bin starting at a particular RCS for $\lambda_1=1$, $p=1.26$, and $q=4$ according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or any other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

APPENDIX

If A and B are $N(0,\lambda/2)$ then $C=A^2+B^2$ follows an exponential ($\lambda$).

Assume that the random variables X and Y are independent and follow an exponential ($\lambda$) distribution, then:

$$f(z) = f_X(z) = f_Y(z) = \frac{1}{\lambda} e^{-\frac{z}{\lambda}}, \quad (A1)$$

and $$Pr\{z_1 < Z \le z_2\} = \int_{z_1}^{z_2} f(z)\,dx.$$

Since X and Y are independent, $$Pr\{z_1 < X \le z_2 \mid z_1 < Y \le z_2\} = Pr\{z_1 < X \le z_2\} \quad (A2)$$

Let $$I[z_1 < X \le z_2] = \begin{cases} 1, & \text{if } z_1 < X \le z_2 \\ 0, & \text{otherwise,} \end{cases} \quad (A3)$$

then $E\{I[z_1 < X \le z_2]\} = Pr\{z_1 < X \le z_2\}$

By the weak law of large numbers, for large N:

$$\frac{1}{N}\sum_{i=1}^{N} I[z_1 < X_i \le z_2] \approx E\{I[z_1 < X \le z_2]\} \quad (A4)$$

$$= Pr\{z_1 < X \le z_2\}, \text{ so}$$

$$\sum_{i=1}^{N} I[z_1 < X_i \le z_2] \approx N\, Pr\{z_1 < X \le z_2\}.$$

Hence, the percentage of samples falling in the interval is equal to the probability of that interval; and the total number of samples falling within an interval is approximately equal to the total number of samples times the probability of the interval.

Within the simulation framework, let $\lambda_1$ be the RCS for region 1 and $\lambda_2$ be the RCS for region 2. Then, $$Pr\{z_1 < Z \le z_2 \mid \text{region 1}\} = e^{-\left(\frac{z_1}{\lambda_1}\right)} - e^{-\left(\frac{z_2}{\lambda_1}\right)} \quad (A5)$$

In addition, let $z_2 = p z_1$ (e.g. $p \approx 1.26$ for bin size of 1 dB), then $$Pr\{z_1 < Z \le z_2 \mid \text{region 1}\} = e^{-\left(\frac{z_1}{\lambda_1}\right)}\left(1 - e^{-(p-1)\frac{z_1}{\lambda_1}}\right) \quad (A6)$$

$$= e^{-\frac{z_1}{\lambda_1}} - e^{-\frac{p z_1}{\lambda_1}}$$

Similarly, if $\lambda_2 = q\lambda_1$, $$Pr\{z_1 < Z \le z_2 \mid \text{region 2}\} = e^{-\left(\frac{z_1}{q\lambda_1}\right)}\left(1 - e^{-(p-1)\frac{z_1}{q\lambda_1}}\right) \quad (A7)$$

$$= e^{-\frac{z_1}{(q\lambda_1)}} - e^{-(p-1)\frac{z_1}{(q\lambda_1)}}$$

Figure 8:
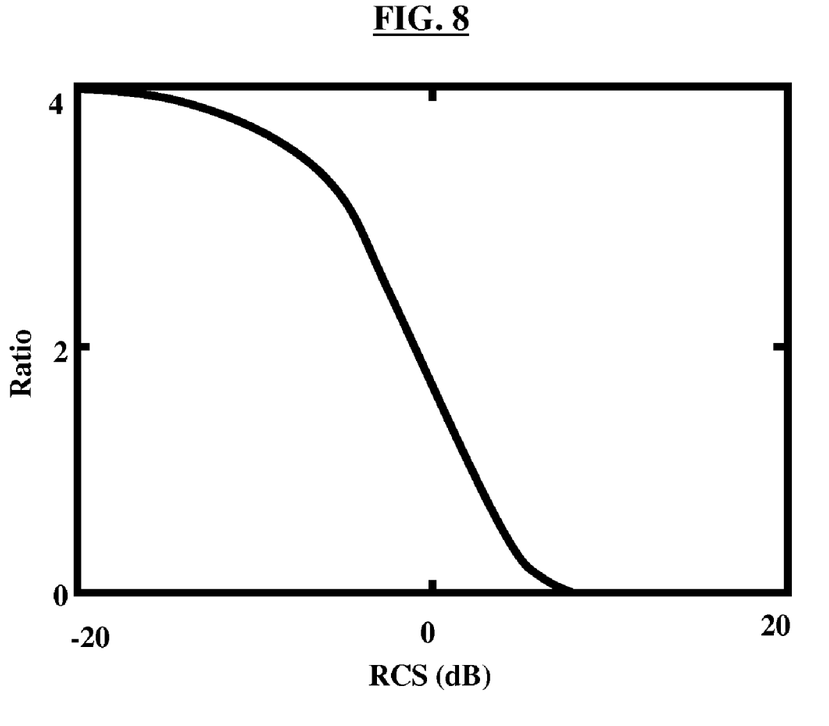
FIG. 8 illustrates a graphical representation comparing the ratio of probabilities for the curves plotted in FIG. 7 according to an embodiment herein.

If $p=q$, then the difference between the RCS from different regions in the simulation is the same as the bin size. Plots of the curves described by equations (A6) and (A7) are included in FIG. 7 for the case where $p=1.26$, $\lambda_1=1.0$, $q=4.0$, and the regions are assumed to contain the same number of pixels. The x-axis in these plots denotes the value at which a particular RCS bin begins (i.e., the value of $z_1$). This corresponds to a second region with average RCS that is 6 dB higher than the first region. FIG. 8 shows how the expected number of samples within a particular bin will vary as a function RCS. For example, if the average RCS of region 2 is 6 dB above region 1 the regions are the same size, then it is expected that about twice as many of the total samples used for calculating the average to come from clutter region 1 than come from clutter region 2 when the RCS bin begins at 0 dB. That is, the ratio is approximately 2 at 0 dB, implying that about 33% of the total number of samples used to calculate the metric is expected to come from region 2.

From equation (A2) and the law of large numbers, it is expected that the average of these samples—representing 33% of the total number of samples when the regions are the same size—to approach 6 dB, not 0 dB. The overall average should then approach:

$$\text{average} = \frac{E\{X_1\}N_1 Pr\{z_1 < Z \le z_2 \mid \text{region 1}\} + E\{X_2\}N_2 Pr\{z_1 < Z \le z_2 \mid \text{region 2}\}}{(N_1 Pr\{z_1 < Z \le z_2 \mid \text{region 1}\} + N_2 Pr\{z_1 < Z \le z_2 \mid \text{region 2}\})}, \quad (A8)$$

where $Pr\{z_1 < Z \le z_2 \mid \text{region i}\}$ represents the probability of the interval for region i, i=1,2, $N_i$ denotes the number of samples in region i and $E\{X_i\}$ denotes the expected value of the random variable $X_i$ distributed according to the probability density function of region i. For this example, in which $N_1 = N_2$, equation (A8) becomes:

average=0.67(1)+0.33*4=1.99≈6 dB

This effect produces a bias, and illustrates why a bias is expected to be seen as observed in FIG. 5.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. The papers titled "A Metric and Self-calibration Algorithm, Surveillance-based Change Detection System Operating on Noisy Imagery" and "Change Detection Using the Synchronous Impulse Reconstruction (SIRE) Radar" and the slide presentation titled "Recent Change Detection Experiments Using ARL's SIRE Radar" are all hereby incorporated by reference. All of the documents listed therein are also hereby incorporated herein by reference to the same extent as if each individual document or publication was specifically and individually incorporated herein by reference.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for self-calibrating an automatic, surveillance-based change detection system operating on noisy imagery, said system comprising:
    a first sensor that detects a first image co-registered with a second image, wherein said first image and said second image each comprise pixels of a noisy image of a scene;
    a second sensor that detects said second image co-registered with said first image, wherein co-registration of said first image with said second image comprises pixels from different images corresponding to a same location within said scene;
    a calibration factor module that receives co-registered imagery data of said first image and said second image and produces a calibration factor based on the co-registered images;
    a metric calculator that directly receives said co-registered imagery data and directly receives said calibration factor and produces a modified ratio of pixel values corresponding to said first image and said second image from the same location within said scene; and
    a modified ratio test module that compares said modified ratio to a pre-determined threshold ratio value.

2. The system of claim 1, wherein said noisy image comprises synthetic aperture radar imagery, grainy photography, and low signal-to-noise ratio video frames.

3. The system of claim 1, wherein said metric calculator sorts pixel values in said first image.

4. The system of claim 3, wherein said metric calculator groups the sorted pixels according to value such that all pixels within an interval of a particular length are combined to form at least one pixel set, makes a list of pixel locations within each said at least one pixel set, and calculates a mean pixel value for each said at least one pixel set.

5. The system of claim 4, wherein said metric calculator selects a set of pixel locations from one of said at least one pixel set, extracts spatially corresponding pixel values from said second image, and calculates a mean value of said pixel values from said second image.

6. The system of claim 5, wherein said metric calculator plots the calculated mean values for said at least one pixel set from said first image, and plots the calculated mean values for pixel sets from said second image, wherein said plot corresponding to said second image is plotted over said plot corresponding to said first image.

7. The system of claim 6, wherein said metric calculator records a corresponding value where a slope of the plots corresponding to said first image and said second image begin to correspond with one another.

8. The system of claim 7, wherein said metric calculator adjusts said plot corresponding to said second image so that said plot corresponding to said second image overlays said plot corresponding to said first image when said interval of said particular length is greater than said corresponding value, and wherein the amount of vertical offset between the plots comprises said calibration factor.

9. The system of claim 8, wherein said metric calculator applies said calibration factor to said second image, wherein said modified ratio equals pixel values corresponding to said first image divided by adjusted pixel values corresponding to said second image, and wherein said adjusted pixel values corresponding to said second image comprise the maximum of (1) the pixel values corresponding to the second image and (2) the value where the slope of graphical plots corresponding to the first image and the second image begin to correspond with one another, for example the selected "floor" $x_F$ where the first image line and second image line intersect and begin to correspond to one another as illustrated in FIG. 3.

10. A method of self-calibrating an automatic, surveillance-based change detection system operating on noisy imagery, said method comprising:
    detecting a first image co-registered with a second image, wherein said first image and said second image each comprise pixels of a noisy image of a scene;
    detecting said second image co-registered with said first image, wherein co-registration of said first image with said second image comprises pixels from different images corresponding to a same location within said scene;
    producing a calibration factor based on the co-registered images;
    producing a modified ratio of pixel values corresponding to said first image and said second image from the same location within said scene; and
    comparing said modified ratio to a pre-determined threshold ratio value.

11. The method of claim 10, wherein said noisy image comprises synthetic aperture radar imagery, grainy photography, and low signal-to-noise ratio video frames.

12. The method of claim 10, further comprising sorting pixel values in said first image.

13. The method of claim 12, further comprising grouping the sorted pixels according to value such that all pixels within an interval of a particular length are combined to form at least one pixel set, making a list of pixel locations within each said at least one pixel set, and calculating a mean pixel value for each said at least one pixel set.

14. The method of claim 13, further comprising selecting a set of pixel locations from one of said at least one pixel set, extracting spatially corresponding pixel values from said second image, and calculating a mean value of said pixel values from said second image.

15. The method of claim 14, further comprising plotting the calculated mean values for said at least one pixel set from said first image, and plotting the calculated mean values for pixel sets from said second image, wherein said plot corresponding to said second image is plotted over said plot corresponding to said first image.

16. The method of claim 15, further comprising recording a corresponding value where a slope of the plots corresponding to said first image and said second image begin to correspond with one another.

17. The method of claim 16, further comprising adjusting said plot corresponding to said second image so that said plot corresponding to said second image overlays said plot corresponding to said first image when said interval of said particular length is greater than said corresponding value, and wherein the amount of vertical offset between the plots comprises said calibration factor.

18. The method of claim 17, further comprising applying said calibration factor to said second image, wherein said modified ratio equals pixel values corresponding to said first image divided by adjusted pixel values corresponding to said second image, wherein said adjusted pixel values corresponding to said second image comprise the maximum of (1) the pixel values corresponding to the second image and (2) the value where the slope of graphical plots corresponding to the first image and the second image begin to correspond with one another, for example the selected "floor" $x_F$ where the first image line and second image line intersect and begin to correspond to one another as illustrated in FIG. 3.

19. A method for self-calibrating an automatic, surveillance-based change detection system operating on noisy imagery, said method comprising:
- receiving a first image that has been co-registered with a second image, wherein said first image and said second image each comprise pixels of a noisy image of a scene;
- receiving said second image that has been co-registered with said first image, wherein co-registration of said first image with said second image comprises pixels from different images corresponding to a same location within said scene;
- producing a calibration factor based on the co-registered images; and
- producing a modified ratio of pixel values corresponding to said first image and said second image from the same location within said scene,
- wherein said modified ratio equals pixel values corresponding to said first image divided by the maximum of (1) the of pixel value corresponding to said second image and (2) a value where the slope of graphical plots corresponding to said first image and said second image begin to correspond with one another.

20. The method of claim 19, further comprising:
- sorting pixel values in said first image;
- grouping the sorted pixels according to value such that all pixels within an interval of a particular length are combined to form at least one pixel set, making a list of pixel locations within each said at least one pixel set, and calculating a mean pixel value for each said at least one pixel set;
- selecting a set of pixel locations from one of said at least one pixel set, extracting spatially corresponding pixel values from said second image, and calculating a mean value of said pixel values from said second image;
- plotting the calculated mean values for said at least one pixel set from said first image, and plotting the calculated mean values for pixel sets from said second image, wherein said plot corresponding to said second image is plotted over said plot corresponding to said first image;
- recording said value where the slope of the plots corresponding to said first image and said second image begin to correspond with one another;
- adjusting said plot corresponding to said second image so that said plot corresponding to said second image overlays said plot corresponding to said first image when said interval of said particular length is greater than said corresponding value, and wherein the amount of vertical offset between the plots comprises said calibration factor; and
- applying said calibration factor to said second image.

* * * * *